United States Patent [19]

Abe

[11] Patent Number: 4,780,610
[45] Date of Patent: Oct. 25, 1988

[54] OPTICAL ROTARY ENCODER HAVING SUPERPOSED METAL PLATE AND SHIELD PLATE

[75] Inventor: Hiraku Abe, Miyagi, Japan

[73] Assignee: Alps Electric Co., Ltd., Japan

[21] Appl. No.: 1,891

[22] Filed: Jan. 9, 1987

[30] Foreign Application Priority Data

Mar. 4, 1986 [JP] Japan .............................. 61-30080[U]
Jun. 24, 1986 [JP] Japan .............................. 61-95351[U]
Jun. 24, 1986 [JP] Japan .............................. 61-95352[U]

[51] Int. Cl.⁴ ........................... G01D 5/34; H01J 3/14
[52] U.S. Cl. ......................... 250/231 SE; 250/237 G
[58] Field of Search ..................... 250/231 SE, 237 G;
200/11 DW, 30 A, 323, 328, 325, 291; 340/347 P, 671

[56] References Cited

U.S. PATENT DOCUMENTS 4,616,131 10/1986 Burkhardt ...................... 250/231 SE
4,644,156 2/1987 Takahashi et al. ............ 250/231 SE
4,673,809 6/1987 Geyer et al. ................... 250/231 SE

*Primary Examiner*—David C. Nelms
*Assistant Examiner*—Michael Messinger
*Attorney, Agent, or Firm*—Guy W. Shoup; Leighton K. Chong; Paul J. Winters

[57] ABSTRACT

A manually-operated optical rotary encoder is provided with light receiving and emitting elements, the optical encoder generating a plurality of pulse signals. The rotary encoder comprises a reflecting plate and a non-reflecting plate which are superposed. The rotary encoder comprises a first code plate and a second code plate, which are alternately and continuously formed with light reflecting portions and non-reflecting portions. The rotary encoder further comprises a roller engageable with concavo-convex portion provided in the outer peripheral edge of the first code plate, a shaft for the roller and a supporting member for rotatably supporting the roller so that the latter may come into contact with the concavo-convex portions. The roller, the shaft and the supporting member are formed of synthetic resin.

4 Claims, 9 Drawing Sheets

OPTICAL ROTARY ENCODER HAVING SUPERPOSED METAL PLATE AND SHIELD PLATE

BACKGROUND OF THE INVENTION

1. Field of the Invention

The present invention relates to a manually-operated optical rotary encoder provided with a light receiving and emitting element, and particularly to an optical rotary encoder for producing a plurality of pulse signals.

2. Description of the Prior Art

Optical encoders for supplying pulse signals by manual operation are disclosed in U.S. Pat. No. 4,387,374 invented by Alan I. Wiener.

The structure for detecting a rotation of a reflecting plate is disclosed in U.S. Pat. No. 4,502,045 invented by Ingrid Fromn.

In addition, the structure for rotating two code plates around a common axis is disclosed in U.S. Pat. No. 3,912,926.

Manually-operated optical rotary encoders which need to be improved will be described with reference to FIGS. 12 through 22.

First, a first apparatus which needs to be improved will be disclosed in FIGS. 12 to 14, in which FIG. 12 is a partly sectioned plan view of a conventional optical rotary encoder, FIG. 13 is a sectional view and FIG. 14 illustrates in section the positional relationship between light reflecting portions of a first code plate and a second code plate. In FIG. 13, reference numeral 1 designates a substrate for wiring of a circuit, 2 a light receiving and emitting element mounted on the substrate 1, and A a first code plate, wherein a shield coating 4 is print-formed on the upper surface of a metal plate 3. Two patterns, which consist of a portion not coated with the coating 4 or a light reflecting portion and a portion coated with the coating 4 or a non-reflecting portion 6, are peripherally, alternately and continuously formed. Reference character B designates a second code plate, in which a shield coating 8 is formed on the upper surface of a metal plate 7 in the procedure similar to that of the first code plate A, and two patterns consisting of a light reflecting portion 9 and a non-reflecting portion 10 are peripherally, alternately and continuously formed. Reference numeral 11 designates a light travelling hole formed in the first code plate A, 12 an outer shaft for rotating and driving the first code plate A, and 13 an inner shaft for rotating and driving the second code plate B, the outer shaft 12 and the inner shaft 13 constituting a dual shaft. Reference numeral 14 designates a bearing and 15 a casing.

When the outer shaft 12 is rotated, light emitted from the light receiving and emitting elements 2 is reflected by the light reflecting portions 5 of the first code plate A or absorbed by the non-reflecting portions 6 to thereby obtain pulse signals as desired from the elements 2 accordingly.

The inner shaft 13 is rotated with the light travelling holes 11 of the first code plate A opposed to the elements 2, and the light emitted from the elements 2 is reflected by the light reflecting portions 9 of the second code plate B or absorbed by the non-reflecting portions 10 to thereby obtain pulse signals as desired from the elements 2 accordingly.

Next, a second and a third apparatus which need be improved will be disclosed in FIGS. 15 to 22, in which FIG. 15 is an exploded perspective view showing the whole structure, FIG. 16 is a plan view showing the state wherein a code plate and a circuit substrate are arranged in correspondence to each other, FIG. 17 illustrates a click mechanism, FIG. 18 is an exploded perspective view showing a roller and a supporting member which constitute the click mechanism, FIG. 19 shows the reverse side of the first code plate, and FIG. 20 shows the reverse side of the second code plate.

In FIG. 15, reference numeral 1 designates a cover which forms a shell, 2 and 3 a first code plate and a second code plate, respectively, arranged relatively rotatably and coaxially opposedly, 4 an inner shaft secured to the first code plate 2, and 5 an outer shaft secured to the second code plate 3, the inner shaft 4 being rotatably arranged within the outer shaft 5. As shown in FIGS. 16 and 19, the first code plate 2 has a surface opposed to the second code plate 3, said surface being peripherally and alternately formed with reflecting portions 6 and non-reflecting portions 7 colored in black, with concave portions 8 and convex portions 9 formed in the outer peripheral edge. As shown in FIGS. 16 and 20, the second code plate 3 has, at positions corresponding to the reflecting portions 6 and non-reflecting portions 7 of the first code plate 2, through-holes or a first window 10 and a second window 11 having the size generally equal to that of the reflecting portions 6, as well as a reflecting window 12 formed of metal. Furthermore, reflecting portions 13 made of metal and non-reflecting portions 14 colored in black are provided peripherally including the first window 10 and the second window 11, and a heart-shaped grooved cam 15 is provided.

A first, a second and a third light receiving and emitting elements 16, 17 and 18 are arranged opposedly to the first window 10, the second window 11 and the reflecting window 12, respectively, of the second code plate 3. Reference numeral 19 designates a retainer for retaining these light receiving and emitting elements 16, 17 and 18, and 20 denotes a slider slidably mounted on the retainer 19, said slider having a square through hole 21. The slider 20 is provided on the upper portion thereof with a pin 22 which engages the edge of a grooved cam 15 of the second code plate 3. A spring indicated at 23 has one end attached to the retainer 19 and the other end attached to the slider 20 to urge the pin 22 so that the latter may engage with the end 24 of the grooved cam 15 shown in FIG. 4.

A circuit substrate 25 indicated at 25 in FIG. 15 having the retainer 19 mounted thereon is formed in the central portion thereof with a hole 26 into which the inner shaft 4 of the first code plate 2 and the outer shaft 5 of the second code plate 3 are rotatably inserted. In FIG. 15, reference numeral 27 designates a roller formed for example of rubber, which engages the concave portion 8 and convex portion 9 of the first code plate 2, 28 a supporting portion for rotatably supporting the roller 27, namely, a supporting member bent into a ]-shape, 29 a supporting post for pivotably supporting the supporting member 28, and 30 shown in FIGS. 16 and 17 denotes a spring for urging the supporting member 28 so that the roller 27 may come into contact with the concave portion 8 and convex portion 9.

The supporting member 28 is formed of metal and has a hole 32a into which a metal shaft 31 of the roller is rotatably inserted as shown in FIG. 18.

In the optical rotary encoder constructed as described above, in the set state, the inner shaft 4 of the first code plate 2 and the outer shaft 5 of the second code plate 3 shown in FIG. 15 are inserted into the hole 26 of the circuit substrate 25 through the through-hole 21 of the slider 20, the pin 2 is brought into engagement with the end 24 of the grooved cam 15, the roller 27 is brought into contact with the concave portion 8 of the first code plate 2 by the force of the spring 30 as shown in FIG. 17, the whole body is covered with the cover 1, and the first window 10, the second window 11 and the reflecting window 12 of the second code plate 3 are positioned so as to oppose to the first, the second and third light receiving and emitting elements 16, 17 and 18, respectively. When the light is projected, in the said set state, from the first, the second and the third elements 16, 17 and 18 toward the second code plate 3 and the first code plate 2 to rotate the inner shaft 4 to rotate the first code plate 2, the second code plate 3 is maintained still since the pin 22 engages with the end 24 of the grooved cam 15. Thereby the projected light of the third element 18 is reflected by the reflecting window 12 of the second code plate 3, and the reflected light is incident upon the third element 18 to release a high level signal from the third element 18. The projected light from the first element 16 and the second element 17 is applied to the reflecting portion 6 or non-reflecting portion 7 of the first code plate 2 through the first window 10 and the second window 11. The reflected light from the reflecting portion 6 is received and the pulse signals are output from the first element 16 and the second element 17. It is noted that the first element 16 and the second element 17 are arranged so that pulse signals different in phase from each other are output from the first element 16 and the second element 17. The operation is repeatedly carried out in which the roller 27 slides over the convex portion 9 of the first code plate 2 into engagement with the concave portion 8 while the first code plate 2 is being rotated, thereby obtaining a clicking feel.

Conversely, in the state wherein the first code plate 2 is maintained still, when the outer shaft 5 is rotated against the force of the spring 23 shown in FIG. 16 to rotate the second code plate 3, the reflecting window 12 of the second code plate 3 moves from the third element 18, whereby the projected light of the third element 18 is not reflected and a low level signal is output from the third element 18. The rotation of the second code plate 3 causes the projected light of the first element 16 and the second element 17 to be applied to the reflecting portion 13 or non-reflecting portion 14 of the second code plate 3. The reflected light from the reflecting portion 13 is received and pulse signals are output from the first element 16 and the second element 17.

In this way, according to the optical rotary encoder, the inner shaft 4 or the outer shaft 5 is rotated to selectively rotate the first code plate 2 and the second code plate 3, thereby enabling to output separate pulse signals.

The conventional optical rotary encoders constructed as described above have various problems as noted below.

According to the first apparatus which needs to be improved, as shown in FIG. 14, the distance a between the surface of the reflecting portion 5 of the first code plate A and the surface of the reflecting portion 9 of the second code plate B is the sum of a thickness $a_1$ of the metal plate 3 of the code plate A and a distance $a_2$ between the reverse side of the metal plate 3 and the surface of the metal plate 6 of the second code plate B. Thus, since the thickness $a_1$ of the metal plate 3 is added, the distance between both the surfaces of the reflecting portions 5 and 9 increases. Accordingly, there is a problem that the light detection characteristic of the element 2 is different between the two code plates A and B. To cope with this, the thickness $a_1$ of the metal plate 3 of the code plate A can be made thinner, in which case, however, there is a problem in that the metal plate 3 loses its rigidity and affects the reflection of light.

A further drawback is the high cost because the pattern composed of the reflecting portions 5, 9 and the non-reflecting portions 6, 10 of the light receiving surfaces of both the code plates A and B is formed by printing the shield coatings 4, 8 on the metal plates 3 and 7.

SUMMARY OF THE INVENTION

It is therefore a first object of the present invention to minimize, as compared with prior art, a difference of detection characteristics of light from light reflecting surfaces of a first and a second code plates, and provide a less expensive optical rotary encoder.

The roller forming the click mechanism in the second and third apparatuses which need be improved is designed so that the shaft 31 thereof is inserted into the hole 32a of the supporting member 28, and when inserting, the shaft 31 of the roller 27 has to be engaged with the hole 32a while spreading the supporting member 28, thus rendering the operation of incorporating the roller 27 cumbersome.

Furthermore, when the shaft 31 of the roller 27 is inserted into the hole 32a of the supporting member 28, the supporting member 28 is spread and slightly deformed before insertion, and therefore, the relationship between the width of a plate portion of the supporting member 28 which is opposed to form a ]-shape, i.e., the bend width and the length of the shaft 31 have to be set so as to have a sufficient accuracy, thus tending to increase the manufacturing cost.

Moreover, in the above-described optical rotary encoder, the shaft 31 of the roller 27 is formed of metal and the supporting member 28 is also formed of metal, and as the result, during the rotation of the roller 27, frictional noises occur, thus tending to impart an unpleasantness to the operation of the rotary encoder.

It is therefore a second object of the present invention to provide an optical rotary encoder which can easily incorporate a roller forming a click mechanism into a supporting member of a roller, which can relatively lower the dimensional accuracy of a roller shaft or the like, and which can prevent occurrence of frictional noises resulting from the rotation of the roller.

In the optical rotary encoder having the structure of the second and third apparatuses which need be improved, the retainer 19 is provided separately from the circuit substrate 25, the first light receiving and emitting elements 16, 17 and 18 are arranged on the retainer 19, and the supporting member 28 which supports the roller 27 by the supporting post 29 is mounted on the circuit substrate 25. Therefore, an error is liable to occur in mounting position between the retainer 19 and the roller 27, thus tending to produce a deviation in positioning of the first code plate 2 to the second code plate 3 according to the error.

More specifically, where the retainer 19 and the roller 27 are mounted on the circuit substrate 25 with the high positioning accuracy, in the set state, the non-reflecting portion 7 of the first code plate 2 properly corresponds to the first window 10 of the second code plate 3, as shown in the developed view of FIG. 9, and accordingly, the second window 11 of the second code plate 3 is properly positioned to obtain the desired output characteristic. However, when the deviation in positioning of the first code plate 2 to the second code plate 3 occurs according to the error in mounting position between the retainer and the roller 27, the first window 10 and the second window 11 are not properly positioned to the non-reflecting portion 7 or the reflecting portion 6, as shown in FIG. 10, to deteriorate the output characteristic.

It is therefore a third object of the present invention the provide an optical rotary encoder which avoids any error in relative mounting position between the retainer retaining the light receiving and emitting element and the roller forming the click mechanism.

In order to overcome various technical tasks as noted above, the present invention comprises technical means peculiar thereto as follows:

For overcoming the first technical task, the first technical means comprises a first code plate formed alternately and continuously with light reflecting portions and non-reflecting portions and provided with light travelling holes, light receiving and emitting elements provided opposedly to the first code plate, and a second code plate formed alternately and continuously with light reflecting portions and non-reflecting portions, said light reflecting portions of the first code plate being arranged opposedly to said light reflecting portions of the second code plate. Furthermore, there is provided a rotary encoder in which the aforesaid first code plate comprises a code plate continuously formed at equal intervals with light reflecting portions formed from metal plates and non-reflecting portions formed from insulating members, light receiving and emitting elements being provided opposedly of said code plate, characterized in that an inclined angle $\theta_2$ formed between the side edge of the non-reflecting portion and the vertical line is set to be greater than a reflecting angle $\theta_1$ of the maximum angle reflecting light from the light receiving and emitting element.

For overcoming the second technical task, there is provided a second technical means characterized in that a roller forming a click mechanism and a shaft for said roller are integrally formed of synthetic resin, a supporting member for supporting the roller is formed of synthetic resin, and a notch capable of holding the shaft is provided in the supporting member.

For overcoming the third technical task, there is provided a third technical means characterized in that a retaining portion for retaining a supporting portion to support a roller forming a click mechanism is provided on a retainer for retaining a light receiving and emitting element forming a pulse signal generating portion.

The above-described technical means are respectively operated in the following procedure.

According to the first technical means, the metal plate having the light reflecting portions of the first code plate and the metal plate having the light reflecting portions of the second code plate are arranged opposite each other, and therefore, the distance between the surfaces of the light reflecting portions of both the code plates can be reduced as compared with prior art. Accordingly, the difference of detection characteristics of light from the first and second code plates of the light receiving and emitting elements can be decreased as compared with prior art. For example, in the first code plate, the metal plate and the shield plate formed with a plurality of holes are formed by molding, a part of the metal plate is exposed from the surface of the shield plate formed of insulating material, said exposed portion forming the light reflecting portions, and the non-reflecting portions are formed by the shield plate surface between the holes. Therefore, the aforesaid structure can be provided at less cost than the conventional case wherein a shield coating is formed by printing on the metal plate to form a pattern comprising light reflecting portions and non-reflecting portions.

Moreover, since the maximum angle reflecting light emitting from the light receiving and emitting element of the first code plate is not intercepted by the thickness of the non-reflecting portion, the pulse width corresponding to the light reflecting portion of the output (A phase) of one light receiving and emitting element is equal to that corresponding to the non-reflecting portion, and the pulse width corresponding to the light reflecting portion of the output (B phase) of the light receiving and emitting element deviated in phase by $\frac{1}{4}$ pitch from said element is equal to that corresponding to the non-reflecting portion, and therefore, the detection speed in the rotating direction is constant with respect to the angular speed of the shaft, thus materially improving the detection accuracy.

According to the second technical means, the shaft of the roller is held by the notch in the supporting member, and therefore the incorporation of the roller into the supporting member can be done by one touch operation. In addition, since the roller, the shaft of the roller and the supporting member are formed of synthetic resin, the bending width of the supporting member and the dimension of the shaft of the roller can be set so that the shaft of the roller may be held by the notch of the supporting member, that is, even if the length of the shaft should be slightly greater than the bending width, the roller may be rotatably supported by inserting the roller through an inlet portion of the notch, whereby the dimensional accuracy of the shaft of the roller and the like may be relatively decreased. Furthermore, since the shaft of the roller and the supporting member are originally formed of synthetic resin, the frictional noises resulting from the rotation of the roller may be prevented.

According to the third technical means, the roller is arranged integral with the retaining portion of the retainer through the supporting portion, and the error in mounting position between the roller and the retainer with respect to the circuit substrate is overcome. Accordingly, the positioning of the first code plate with respect to the second code plate may be carried out with high accuracy to provide an the excellent output.

The aforesaid technical means are composed of a code plate in which a reflecting plate and a non-reflecting plate are superposed at least one of which is provided with a suitable number of notches in the peripheral portion of the reflecting plate and or the non-reflecting plate, whereby providing a manually-operated optical rotary encoder which can perform the aforementioned function in a stable manner and which is inexpensive.

DESCRIPTION OF THE PREFERRED EMDBODIMENTS

Figure 1:
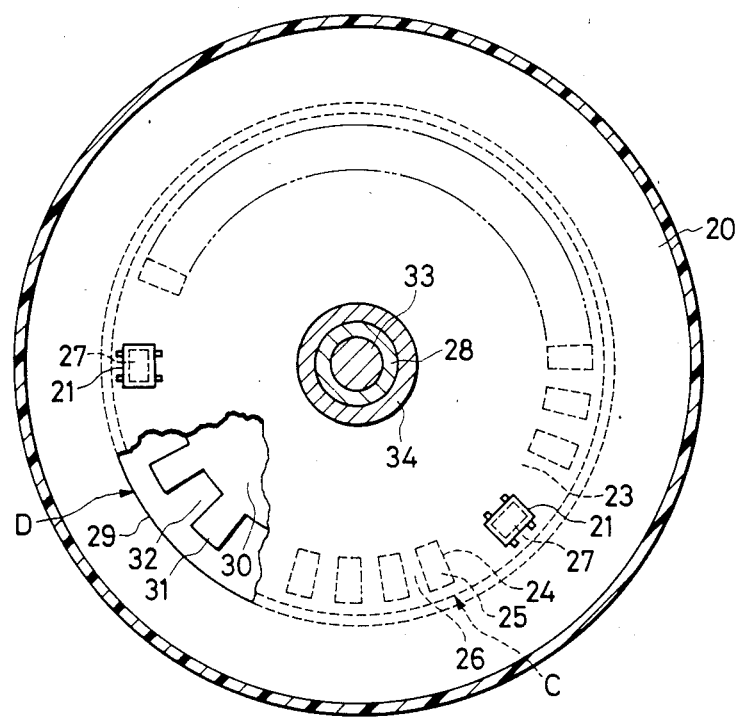
FIG. 1 is a sectional view showing a top view of an optical rotary encoder having a first technical means.

Embodiments respectively comprising their technical means will be described hereinafter in connection with the respective drawings. Parts which are the same as or corresponding to those described hereinbefore are indicated as at the same reference numerals as those previously used to omit the detailed description thereof.

One embodiment having the first technical means and the other embodiment will be described with reference to FIGS. 1 to 3, and FIGS. 6 to 11, respectively.

Figure 2:
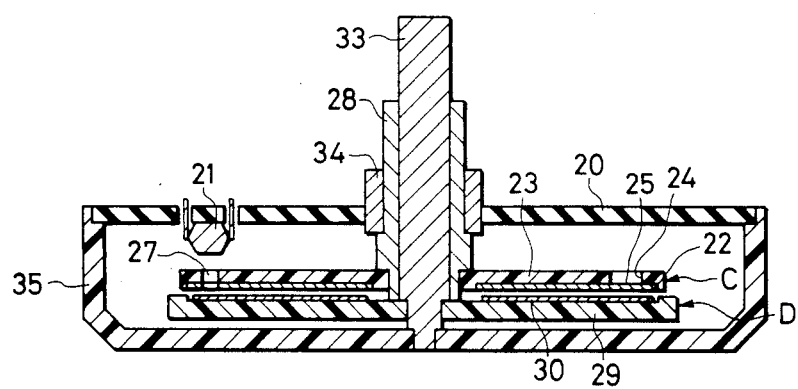
FIG. 2 is a longitudinal sectional view of the optical rotary encorder shown in FIG. 1.
Figure 3:
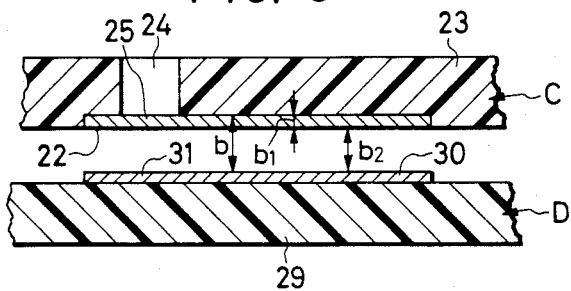
FIG. 3 is a sectional view showing, in an enlarged scale, a code plate shown in FIG. 2.

FIG. 1 showing one embodiment is a plan view partly in section of a rotary encoder, FIG. 2 is a sectional view, and FIG. 3 illustrates the positional relationship between light reflecting portions of both code plates.

In FIG. 2, reference numeral 20 designates a substrate, 21 a light receiving and emitting element mounted on the substrate 20, and C a first code plate which is composed of a metal plate 22 having an extremely small thickness and a shield plate 23 which is an insulator made of resin mold and absorbs light. This shield plate 23 is provided with holes 24 which are a plurality of notches formed at intervals, and a part of the metal plate 22 is exposed. This exposed portion forms a light reflecting portion 25 of the first code plate. Non-reflecting portions 26, 26 are formed between the holes 24, 24, which are radial and in the form of a folding fan on the whole along the periphery of the shield 23. Accordingly, the first code plate is formed continuously and alternately with light reflecting portions 25, 25 and non-reflecting portions 26, 26 along the periphery thereof. The first code plate C is formed with light travelling holes 27 in the form of through-holes provided in the shield plate 23 and the metal plate 22. In the light travelling holes 27 there are provided light receiving and emitting elements 21, 21 in connection of predetermined correspondingly arranged positions to detect the rotation of a second code plate D which will be described hereinafter. The first code plate C is fixedly mounted on a rotating and driving outer shaft. The first code plate C is formed by out-inserting the metal plate 22 and superposing it on the shield plate 23 to fasten them together, or by separating forming them and thereafter superposing them together to caulk them.

The second code plate D has a metal plate 30 thereof secured onto an insulating plate 29 on the side of the metal plate 22. The metal plate 30 is provided with a plurality of radial notches along the periphery of the plate 30, the notches being in the form of projections. The projections are in the form of light reflecting portions 31, 31 which can be detected by the light receiving and emitting elements 22 through the light travelling holes 27. Thus, in the second code plate D, the notches of the metal plate 30 are formed as non-reflecting portions 32, 32 in which the surface of the insulating plate 29 is exposed, and the projections of the metal plate 30 are formed as light reflecting portions 31, 31 which are provided continuously and alternately over the entire periphery thereof. The second code plate D is formed in a procedure similar to that of the aforementioned first code plate, and is secured to a rotating and driving inner shaft 33. The inner shaft 33 and the aforesaid outer shaft 28 constitute a dual shaft, externally of which is provided a bearing 34. This bearing 34 is secured to the substrate 1 on which the light receiving and emitting elements 21, 21 and the like are mounted. The substrate 1 is mounted so that the sides on which the first and second code plates C and D are disposed are covered with a casing 35. The casing 35 is formed in the central portion thereof with a hole, into which an end of an intermediate shaft 33 is rotatably inserted.

In the case where the above-described code plates which are optical scales are secured by superposing the aforementioned separately formed metal plates 22, 30, the shield plate 23 and the insulating plate 29, the code plates are constructed as below. The metal plates 22 and 30 are formed into the aforementioned shape by subjecting a glossy aluminum sheet having a thickness of 0.5 mm or so with a reflectivity of approximately 80% to pressing or etching, where a reflecting efficiency of a totally reflected mirror made by vaporising an aluminum material on a sheet of glass of which both surfaces are finished into a mirror face is 100%. A stainless steel sheet may also be processed similarly. The metal plates 22 and 30 thus processed by pressing leave Rs or burrs in their processed end surfaces. Where the front surface with the Rs is placed in contact with and superposed on the separately formed shield plate 23 and the insulating plate 29, it is necessary to leave a large clearance between the first and second code plates C and D in anticipation of burrs created in said front surface. Thus, in order to decrease the clearance, the front surface is superposed so as to come into contact with the shield plate 23 and the insulating plate 29. The portions having the ends of the metal plates 22 and 30 of the shield plate 23 and the insulating plate 29 may be formed to be further lowered in level to thereby prevent the detection output from being deteriorated due to the bends of the metal plates 22 and 30. Furthermore, as to the second code plate D, the non-reflecting portions 32, 32 . . . are likewise formed to be further lowered in level to thereby further lower the non-detection output level.

These inconveniences resulting from the burrs may be improved by out-inserting the metal plates 20 and 30. That is, if the front surface is formed while being directed toward the shield plate 23 and the insulating plate 29, the raised dimension of the burr portion is absorbed by the flowing resin to eliminate the problem caused by the bending of the metal plates 20 and 30.

In this optical rotary encoder, when the shaft 28 is rotated, the light emitted from the light receiving and emitting elements 21 is reflected by the light reflecting portions 25 of the first code plate C and intercepted by the non-reflecting portions 26, whereby the desired pulse signals may be obtained from the elements 21 accordingly.

When the inner shaft 33 is rotated with the light travelling holes 27 of the first code plate C opposed to the elements 21, the light emitted from the elements 21 is reflected by the light reflecting portions 31 of the second code plate D or intercepted by the non-reflecting portions 32, whereby the desired pulse signals may be obtained from the elements accordingly.

As shown in FIG. 3, the distance b between the surface of the light reflecting portion 25 of the first code plate C and the surface of the light reflecting portion 31 of the second code plate d is the sum of the wall thickness $b_1$ of the metal plate 22 and the distance $b_2$ between the reverse side of the metal plate 22 and the surface of the metal plate 31 and may be made to have the distance shorter than the distance a between the light reflecting portions 4 and 7 of the prior art first and second code plates A and B, and therefore the difference of the light detection characteristics of the elements 21 from the light reflecting portions 25 and 31 of the first and second code plates C and D may be set to be considerably smaller than that of prior art.

Moreover, the first code plate C having the light reflecting portion 25 and the non-reflecting portion 26 may be formed from a molded product. Therefore, the first code plate C is manufactured at much less cost than the prior art wherein the shield coating 4 is formed on the metal plate 3 by printing to form the light reflecting portions 5 and the non-reflecting portions 6, and in addition, the rigidity thereof may be sufficiently secured by molding despite the metal plate 3 is extremely thin.

A further embodiment will be described hereinafter in connection with FIGS. 6 to 11. Parts in the above-described embodiment which have been described in connection with FIGS. 1 to 3 and parts having the same function as those described above are indicated as at the same or relevant reference numerals, and detailed description of which will be omitted.

The first code plate C shown in FIGS. 1 to 3 is prepared by molding and composed of a considerably thin metal plate 22 and a shield plate 23 formed of an insulating material. The shield plate 23 is provided with a pluarlity of holes 24 at equal intervals as shown in FIG. 1, and a part of the metal plate 22 is exposed, said exposed portion forming a light reflecting portion 25, and a non-reflecting portion 26 is formed by the surface of the shield plate 23 between the holes 24 to thereby form continuously and at equal intervals the light reflecting portions 25 and non-reflecting portions 26. Reference numeral 27 designates a light travelling hole extending through the shield plate 23 and the metal plate 22, and reference numeral 28 designates a rotating and driving outer shaft for the first code plate C. Reference character F designates a second code plate. A metal plate 30 having a plurality of radial exposed portions is secured onto an insulating plate 29, a light reflecting portion 31 is formed by the projection, and a non-reflecting portin 32 is forme dby the surface of the insulating plate 29 to thereby form at equal intervals and continuously the light reflecting portions 31 and non-reflecting portions 32. Reference numeral 33 designates an inner shaft for rotating and driving the second code plate D, and an outer shaft 28 and the inner shaft 33 form a dual shaft. Reference numeral 34 designates a bearing, and 35 a casing. When the outer shaft 28 is rotated, the light emitted from the light receiving and emitting element 2 is reflected by the light reflecting portion 25 of the first code plate C and intercepted and absorbed by the non-reflecting portion 26, whereby the desired pulse signal may be obtained from the element 2 accordingly. When the inner shaft 33 is rotated with the light travelling hole 27 of the first code plate C opposed to the element 2, the light emitted from the element 2 is reflected by the light reflecting portion 31 of the second code plate F or absorbed and intercepted by the non-reflecting portion 32, whereby the desired pulse signal may be obtained from the element accordingly. With this construction, the distance between the light reflecting portions 25 and 31 of the first and second code plates C and D is shortened to set smaller the difference of the light detection characteristic of the element 2 from the light reflecting portions 25 and 31 of the first and second code plates C and D.

Figure 6:
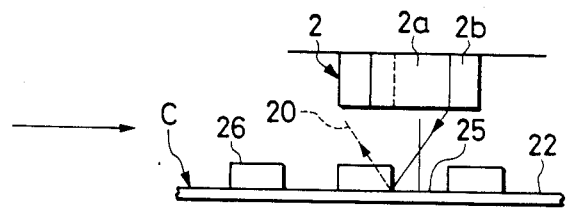
FIG. 6 is a view for explaining the detection structure of a first code plate of the optical rotary encoder shown in FIG. 1.
Figure 8:
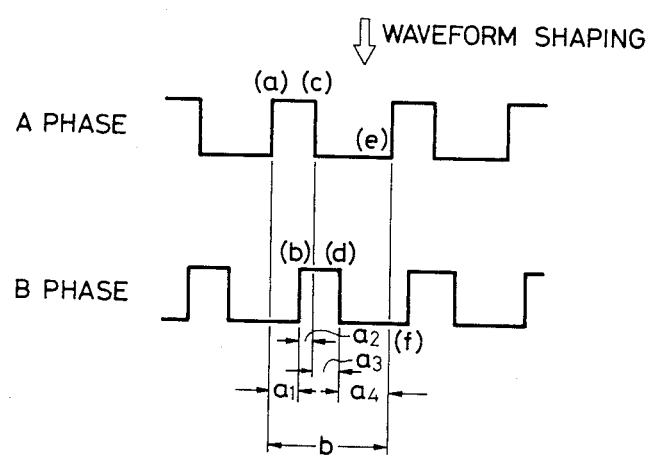
FIG. 8 is an output waveform subjected to shaping of the waveform shown in FIG. 7.

Incidentally, in the first code plate C, in order to properly know the angular position even if the normal and reverse rotation of the outer shaft 28 is repeated, the rotating direction of the code plate C has to be judged. For this method, in the past, two light receiving and emitting elements 2a and 2b are opposed to the code plate E with a phase deviated by ¼ of one pitch 4b as shown in FIG. 6. Thus, assuming that the outputs of the two elements 2a and 2b are A phase and B phase, respectively, the A phase is the sin wave and the B phase is the cos wave due to the phase difference of ¼ pitch. This can be formed into the pulsated output as shown in FIG. 8.

Figure 7:
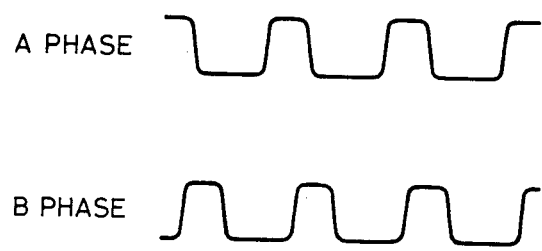
FIG. 7 is an output waveform of FIG. 6.

However, in the first embodiment as described above, as shown in FIG. 6, the maximum angle reflecting light 20 emitted from the element 2a is intercepted by the thickness of the non-reflecting portion 26, and therefore, an asymmetrical waveform as shown in FIG. 7 is output. The same is true for the case of the element 2b. Therefore, in FIG. 8, the pulse width between (a)–(c) of the A phase corresponding to the reflecting portion 25 is not equal to the pulse width between (c) to (e) corresponding to the non-reflecting portion 26, and likewise, the pulse width between (b) to (d) of the B phase corresponding to the reflecting portion 25 is not equal to the pulse width between (d) to (f) corresponding to the non-reflecting portion 26.

Accordingly, comparing both pulses of A and B phases, a section $a_1$ from (a) to (b), a section $a_2$ from (b) to (c), a section $a_3$ from (c) to (d) and a section $a_4$ from (d) to (e) are all different in length.

Accordingly, in case where for example, the rotation in the reverse direction (in the direction as indicated by the arrow) is detected, the (d) of the B phase is detected and then the (c) of the A phase is to be detected, a difference of which is $a_3$, which is equal to each other.

Thus, in case where for example, the rotation in the reverse direction (in the direction as indicated by the arrow) is detected, the (d) of the B phase is detected and then the (c) of the a phase is to be detected, and in the case where the rotation in the normal direction is detected, the (a) of the A phase is first detected, and then the (b) of the B phase is to be detected, a difference of which is $a_1$. The relation of $a_1 \neq a_3$ is present as described above, and therefore there is a fear that the detection speed in the rotating direction with respect to the angular speed of the shaft 9 is not constant.

The above-described embodiment is to solve the difficulties noted above, and the technical task provides a rotary encoder which can make the detection speed in the rotating direction constant with respect to the angular speed of the shaft.

An embodiment of the rotary encoder which has solved the technical task will be described with reference to the drawings.

Figure 9:
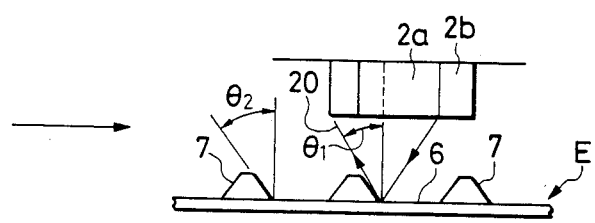
FIG. 9 is a view for explaining a detection structure improved over FIG. 7.
Figure 10:
FIG. 10 is an output waveform of FIG. 9.
Figure 11:
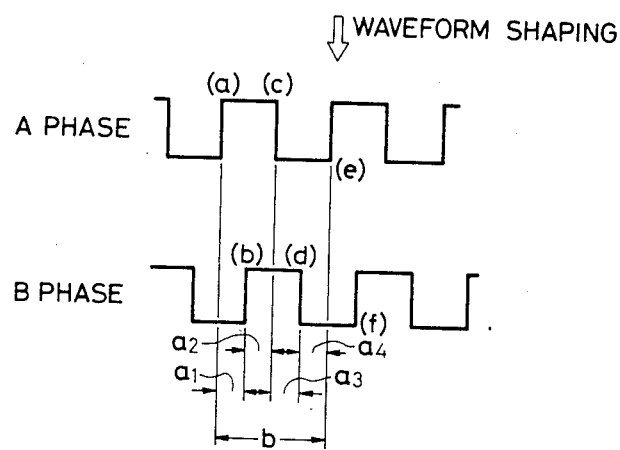
FIG. 11 is an output waveform subjected to shaping of the waveform of FIG. 10.
Figure 12:
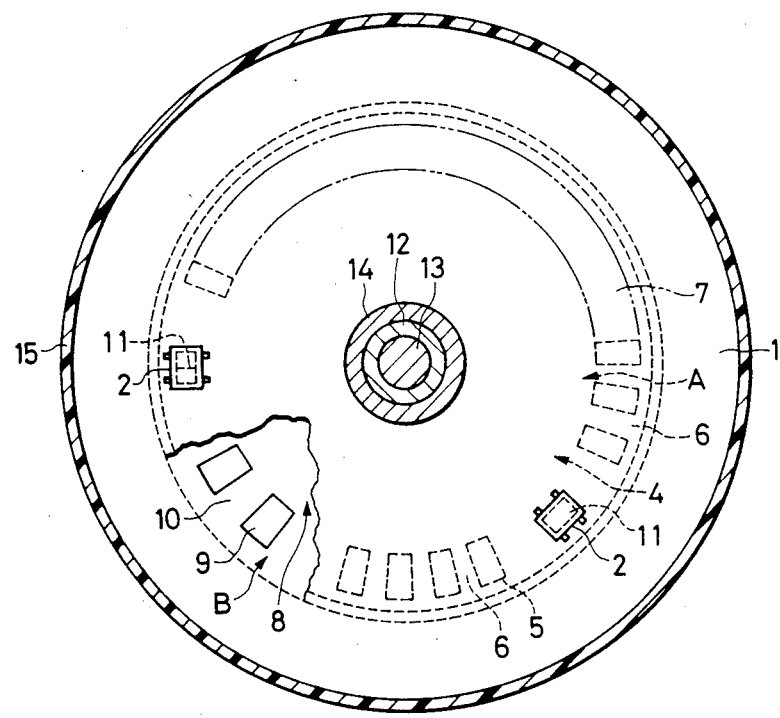
FIGS. 12 to 22 illustrate prior art examples.
Figure 13:
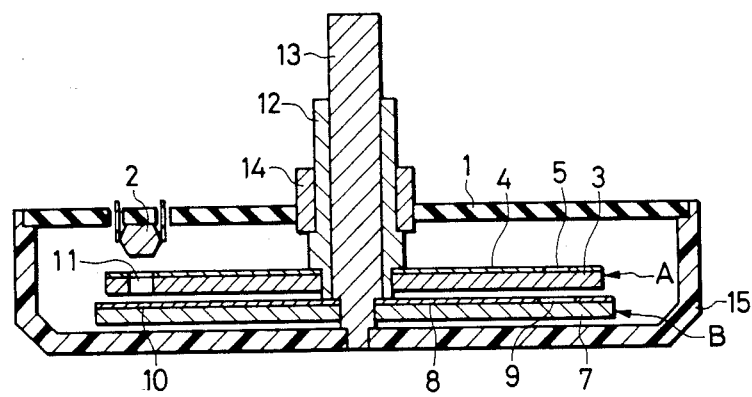
Figure 14:
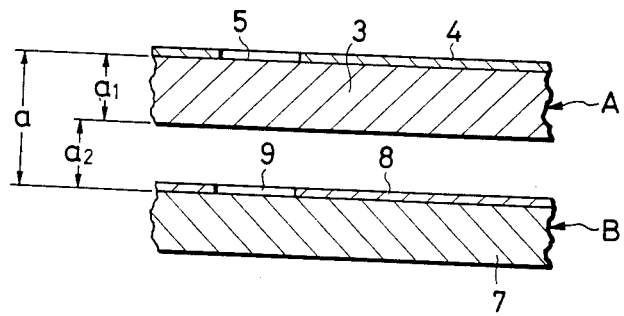

FIGS. 9 to 14 illustrate an improved embodiment, in which FIG. 9 is a schematic view showing the positional relationship between the code plate and the light receiving and emitting element, FIG. 10 shows the output waveform of A phase of the first light receiving and emitting element and the output waveform of B phase of the second light receiving and emitting element with a phase deviated in pitch by ¼ from the first element, and FIG. 12 shows the pulsated output waveform. Parts which are the same as those shown in FIGS. 6 to 8 are indicated as at the same reference numerals.

In FIG. 9, reference numeral $2a$ designates a first light receiving and emitting element, $2b$ a second light receiving and emitting element arranged on the code plate e with a phase deviated in pitch by ¼ from the first element $2a$, 6 a light reflecting portion formed from a a metal plate, and 7 a non-reflecting portion formed of an insulating material, with an inclined angle $\theta_2$ between the side edge of the non-reflecting portion 7 and the vertical line being set to be greater than a reflecting angle $\theta_1$ of the maximum angle reflecting light 20 of the first element 2. The same is true for the second light receiving and emitting element $2b$.

Accordingly, the maximum angle reflecting light 20 of the elements $2a$ and $2b$ is input into the elements $2a$ and $2b$ without being intercepted by the thickness of the non-reflecting portions 7, and therefore, the pulse widths (a) to (c) corresponding to the light reflecting portions 6 of the A phase of the pulsated output waveform shown in FIG. 3 are equal to the pulse width (c) to (e) corresponding to the non-refleting portions 7, and the pulse widths (b) to (d) corresponding to the light reflecting portions 6 of B phase are equal to the pulse widths (d) to (f) corresponding to the non-reflecting portions 7.

Accordingly, in the case where in FIG. 11, a section $a_1$ from (a) to (b), a section $a_2$ from (b) to (c), a section $a_3$ from (c) to (d) and a section $a_4$ from (d) to (e) are detected, the (a) of the A phase is first detected and then the (b) of B phase is to be detected. However, since the section $a_3$ from (d) to (c) is to the section $a_1$ from (a) to (b), the detection speed in the rotating direction is constant with respect to the angular speed of the shaft 9.

An embodiment having the second technical means will be described in connection with FIGS. 4 and 5. Parts which have been described in connection with FIGS. 15 to 20 are indicated by the same reference numerals, detailed description of which will be omitted.

Figure 4:
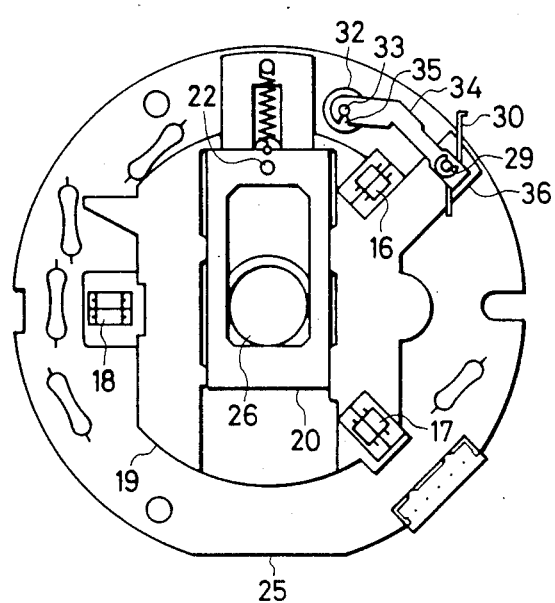
FIG. 4 is a plan view showing the internal mechanism of an optical rotary encoder having a second and a third technical means.
Figure 5:
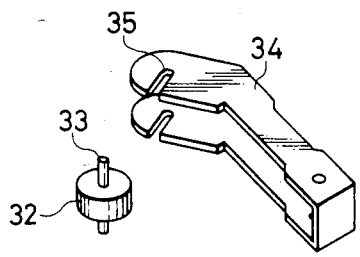
FIG. 5 is an exploded perspective view showing a roller portion which forms a part of a click mechanism of FIG. 4.

FIG. 4 is a plan view showing essential parts of one embodiment of an optical rotary encoder according to the present embodiment, and FIG. 5 is an exploded perspective view showing a roller portion constituting a click mechanism provided in the present embodiment.

In FIG. 4, reference numeral 25 designates a circuit substrate, 19 a retainer arranged on the circuit substrate 25, 20 s slider slidably provided on the retainer 19, 16, 17 and 18 first, second and third light receiving and emitting elements, respectively, 26 a hole formed in the circuit substrate 25 and into which are rotatably inserted an inner shaft of a first code plate and an outer shaft of a second code plate not shown, and 22 a pin which engages a grooved cam of the second code plate not shown, these elements being ones equal to those shown in FIG. 4. Though not shown, the first code plate having the inner shaft and the second code plate having the outer shaft are also equal to those shown in FIGS. 3, 4, 7 and 8.

Reference numeral 32 designates a roller which contacts with concavo-convex portions of the first code plate not shown to constitute a click mechanism with these concavo-convex portions, and 33 a shaft for the roller 32, said roller 32 and shaft 33 being formed integrally of synthetic resin. Reference numeral 34 designates a supporting portion or a supporting member for supporting the roller 32 and is formed of synthetic resin, having at the end thereof a notch 35 capable of holding the shaft 33 for the roller 32.

Reference numeral 36 designates a retaining portion formed with a part of the retainer 19 extended, and a supporting post 29 for swingingly supporting the supporting member 34 is stood upright on the retaining portion 36. Reference numeral 30 shown in FIG. 1 designates a spring equal to that shown in FIGS. 4 and 5, and the supporting member 34 is urged by the spring so that the roller 32 may come into contact with the concavo-convex portions of the first code plate not shown.

In the embodiment constructed as described above, the supporting member 34 for supporting the roller 32 is held through the post 29 in the retaining portion 36 which extends to the retainer 19 for retaining the first, second and third light receiving and emitting elements 16, 17 and 18 to thereby remove an error in mounting position of the roller 32 and retainer 19 with respect to the circuit substrate 25, whereby the high accuracy may be obtained without producing a deviation in positioning of the first code plate with respect to the second code plate, thus well maintaining the projected light from the first, second and third light receiving and emitting elements 16, 17 and 18 and the output characteristic of the pusle signal released according to the rotation of the first or second code plate.

In addition, according to this embodiment, the shaft 33 for the roller 32 is held at the notch 35 of the supporting member 34, and the shaft 33 for the roller 32 is merely forced into the notch 35 from the side, that is, it may be mounted on the supporting member 34 in a one touch manner. Accordingly, the operation of incorporating the roller 32 is easy and the steps of manufacture may be decreased.

Furthermore, the supporting member 34 is formed of synthetic resin, and therefore the notch 35 thereof is resiliently deformable. Even if the diameter of the shaft 33 for the roller 32 is slightly greater than the width of the notch 35, the shaft 33 may be rotatably held by the notch. Also, in such a state, since the supporting member 34 is biased by the force of the spring 30 shown in FIG. 1 so that the roller 32 may come into contact with the outer peripheral edge of the first code plate not shown, the roller 32 is not possibly disengaged from the supporting member 34. Therefore, the dimension of the diameter of the shaft 33 for the roller 32 or the dimension of the width of the notch 35 can be set with relatively low accuracy, thus lowering the manufacturing cost.

Furthermore, as described above, in incorporating the roller 32 into the supporting member 34, the shaft 33 for the roller 32 is forced into the notch 35 from the side, that is, the roller 32 may be incorporated into the notch 35 without deforming the supporting member 34. Therefore, it will suffice that the length of the shaft 35 is longer than the bending width of the supporting member 34, in which case, there poses no problem even if the length of the shaft 35 is somewhat great. Accordingly, the relationship between the length of the shaft 33 and the setting of the dimension of the supporting member 34 can be set to be relatively low accuracy, thus lowering the manufacturing cost also in this respect.

Moreover, in this embodiment, since the shaft 33 for the roller 32 and the supporting member 34 are both formed of synthetic resin, the frictional noises resulting from the rotation of the roller 32 does not occur because the synthetic resins rub each other, thus preventing an unpleasantness from imparting to an operator of the rotary encoder.

An embodiment having the third technical means will be described in connection with FIGS. 4 and 5. The aforementioned parts will not be described in detail.

Figure 15:
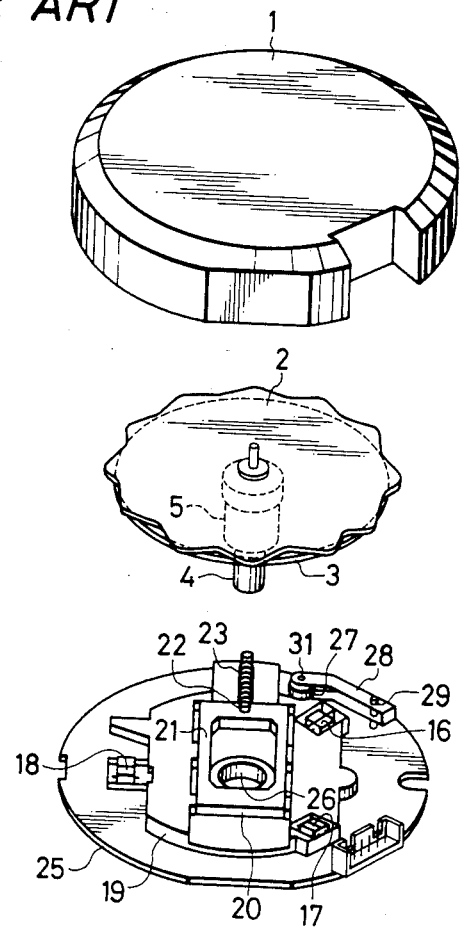
Figure 16:
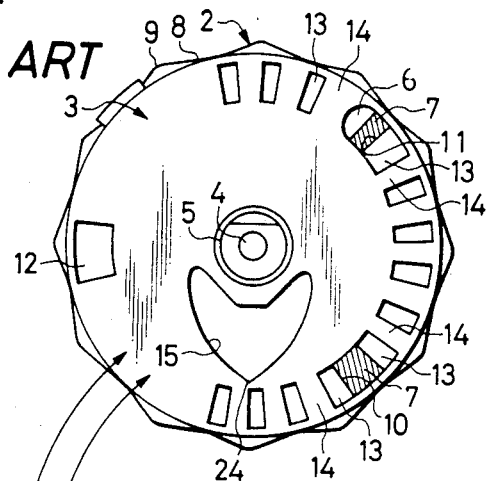
Figure 17:
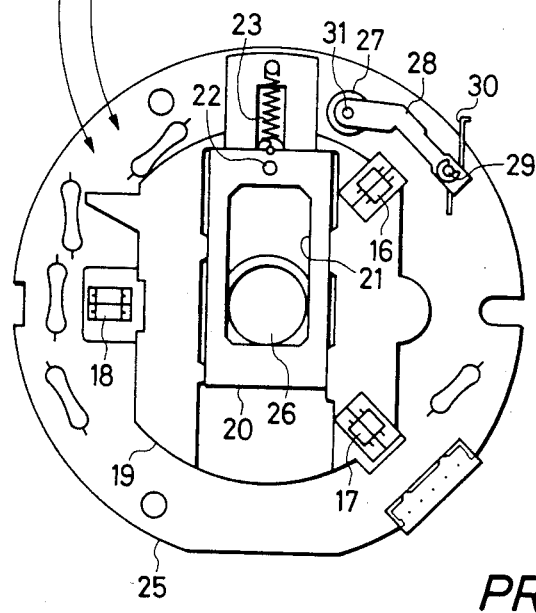
Figure 17:
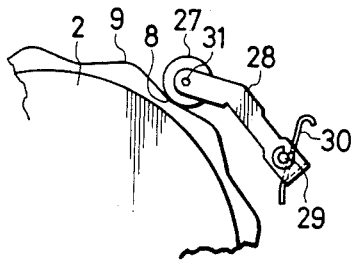
Figure 18:
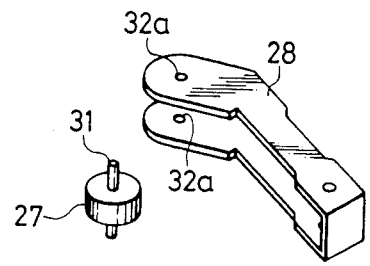
Figure 19:
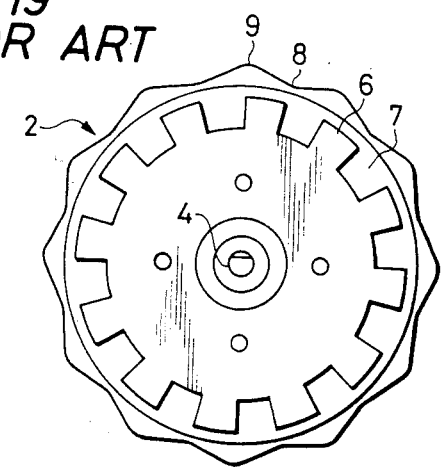
Figure 20:
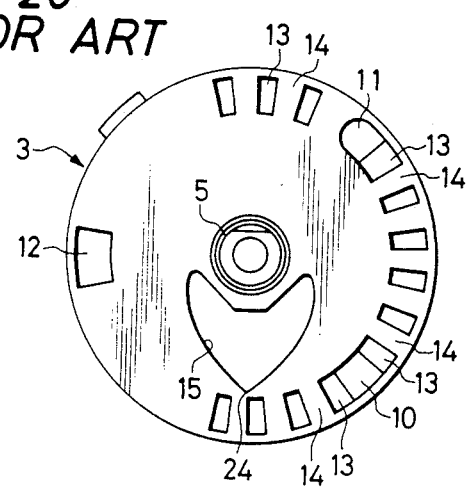
Figure 21:
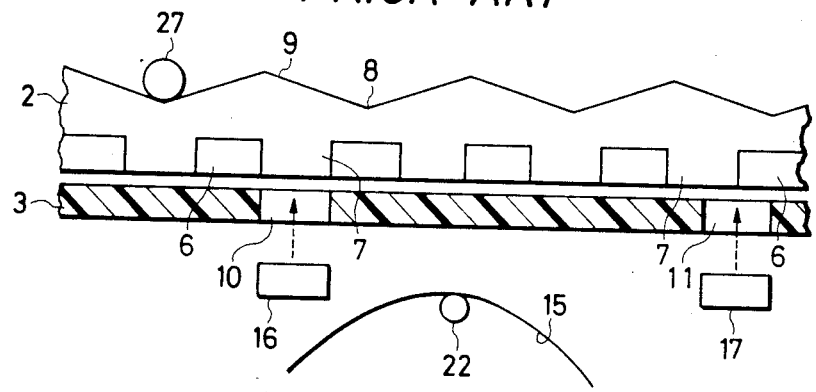
Figure 22:
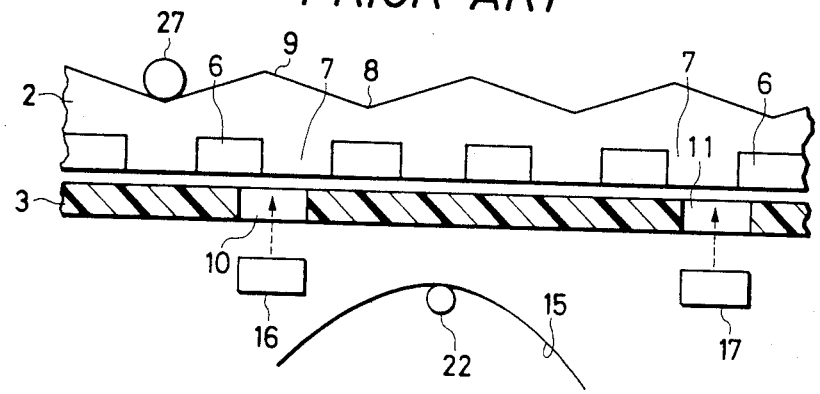

In FIG. 4, reference numeral 25 designates a circuit substrate, 19 a retainer arranged on the circuit substrate 25, 20 a slider slidably provided on the retainer 19, 16, 17 and 18 a first, a second and a third light receiving and emitting elements, respectively, 26 a hole formed in the circuit substrate 25 and into whichy an inner shaft of the first code plate and an outer shaft of the second code plate not shown hereub are inserted, and 22 a pin which engages a grooved cam of the second code plate not shown, these elements being equal to those shown in FIGS. 15 and 16. The first code plate having the inner shaft and the second code plate having the outer shaft are also equal to those shown in FIGS. 15, 16, 19 and 20.

Reference numeral 32 designates a roller which comes into contact with concavo-convex portions of the first code plate not shown to constitute a click mechanism together with these concavo-convex portions, and 33 a roller shaft 32, these roller 32 and shaft 33 being formed integrally of synthetic resin. Reference numeral 34 designates a supporting portion for supporting the roller 32, that is, a supporting member, which is formed of synthetic resin, the supporting member being formed at the end thereof with a notch 35 capable of holding the shaft 33 for the roller 32.

Reference numeral 36 designates a retaining portion formed by extending a part of the retainer 19, and a supporting post 29 for swingingly supporting the supporting member 34 is stood upright on the supporting member 36. Reference numeral 30 shown in FIG. 4 is a spring equal to that shown in FIGS. 16 and 17, by which spring 30 the supporting member 34 is biased so that the roller 32 may come into contact with the concavo-convex portions of the first code plate not shown.

In the embodiment constructed as described above, the supporting member 34 for supporting the roller 32 is held through the supporting post 29 in the retaining portion 36 formed by being extended from the retainer 19 for retaining the first, second and third light receiving and emitting elements 16, 17 and 18. Therefore an error in mounting position of the roller 32 and the retainer 19 with respect to the circuit substrate 25, whereby the high accuracy may be obtained without producing a deviation in positioning of the first code plate to the second code plate not shown, thus well maintaining the projected light from the first, second and third elements 16, 17 and 18, and the output characteristic of the pulse signal released according to the rotation of the first code plate or the second code plate.

In this embodiment, the shaft 33 for the roller 32 is held at the notch 35 of the supporting member 34, and the shaft 33 for the roller 32 is merely forced into the notch 35 from the side, that its, the shaft 33 may be mounted to the supporting member 34 in a one-touch manner, thus facilitating the incorporating operation of the roller 32 to decrease the steps of manufacture.

In addition, since the supporting member 34 is formed of synthetic resin, the notch 35 thereof is resiliently deformable.

According to a further embodiment, since the maximum angle reflecting light from the light receiving and emitting elements is not intercepted by the thickness of the non-reflecting portion, the pulse width corresponding to the reflecting surface of the output (A phase) of the first light receiving and emitting element is equal to the pulse width corresponding to the non-reflecting surface, and the pulse width corresponding to the reflecting surface of the output (B phase) of the second light receiving and emitting element with a phase deviated by ¼ pitch from the first light receiving and emitting element is equal to the pulse width corresponding to the non-reflecting surface, thus having the effect in that the detection speed in the rotating direction is constant to the angular velocity of the shaft.

The optical rotary encoder having the second technical means is constructed as described above, and therefore, the operation of incorporating the roller forming the click mechnism into the supporting member may be accomplished easily. Accordingly, the steps of manufacture may be decreased as compared to that of prior art, and the dimensional accuracy of the shaft of the roller and the like may be relatively lowered. Thus, the manufacturing cost may be lowered as compared with that of the prior art, and the frictional noises resulting from the rotation of the roller can be prevented, thus not imparting an unpleasantness to the operator of the rotary encoder.

The optical rotary encoder having the third technical means is constructed as described above, and therefore, an error in mounting position of the roller and the retainer retaining the light receiving and emitting elements to the circuit substrate may be removed, and accordingly, the excellent output characteristic may be secured.

According to the first technical means, since the distance between the light reflecting portion of the first code plate and the light reflecting portion of the second code plate may be shortened as compared with the prior art, there has the effect in that a difference of the light detection characteristic of the light receiving and emitting elements from the light reflecting portions of the first and second code plates may be minimized as well as the effect in that the manufacturing cost may be lowered as compared with the prior art by molding the first code plate.

What is claimed is:

1. An optical rotary encoder comprising:
 a first code plate including a first metal plate and a shield plate superposed thereon having a plurality of exposure holes therein which are spaced apart at equal intervals, wherein light reflecting portions are formed by said first metal plate being exposed through the exposure holes of said first shield plate, and non-reflecting portions are formed by portions of said shield plate between the exposure holes, said reflecting and non-reflecting portions being formed alternately and continuously on one side of said first code plate, and a plurality of light transmitting holes formed through said first metal plate and said first shield plate;

an outer shaft mounting said first code plate for rotation;

a second code plate having light reflecting portions and non-reflecting portions formed alternately and continuously on one side of said second plate which faces in confronting relation to said light transmitting holes of said first code plate;

an inner shaft mounting said second code plate for rotation, which is arranged coaxially with said outer shaft such that said first code plate is rotatable relative to said second code plate; and optical scale encoding means including light emitting and receiving elements for detecting light emitted from the light receiving elements and reflected and non-reflected from said first code plate, and for detecting light emitted from the light receiving elements, transmitted through said light transmitting holes of said first code plate and reflected and non-reflected from said second code plate.

2. An optical rotary encoder further comprising a click mechanism being formed by concavo-convex portions provided in the outer peripheral edge of said first code plate and a roller engageable with said concavo-convex portions, and a supporting member being provided to rotatably supporting said roller so that the latter may comes into contact with said concavo-convex portions, characterized in that said roller and a shaft for said roller are integrally formed of synthetic resin, said supporting member being formed of synthetic resin, and said supporting member being provided with a notch which can hold said shaft.

3. An optical rotary encoder further comprising, a click mechanism being formed by concavo-convex portions provided in the outer peripheral edge of said first code plate and a roller engageable with said concavo-convex portions, said rotary encoder comprising a retainer for retaining said light receiving and emitting elements, and a supporting portion for rotatably supporting said roller so that the latter may come into contact with said concavo-convex portions.

4. An optical rotary encoder according to claim 1, wherein on said shield plate an inclined angle $\theta_2$ formed between the side edge of the non-reflecting portion and the vertical line is set to be greater than a reflecting angle $\theta_1$ of the maximum angle reflecting light from the light receiving and emitting elements.

* * * * *